Figure 1:
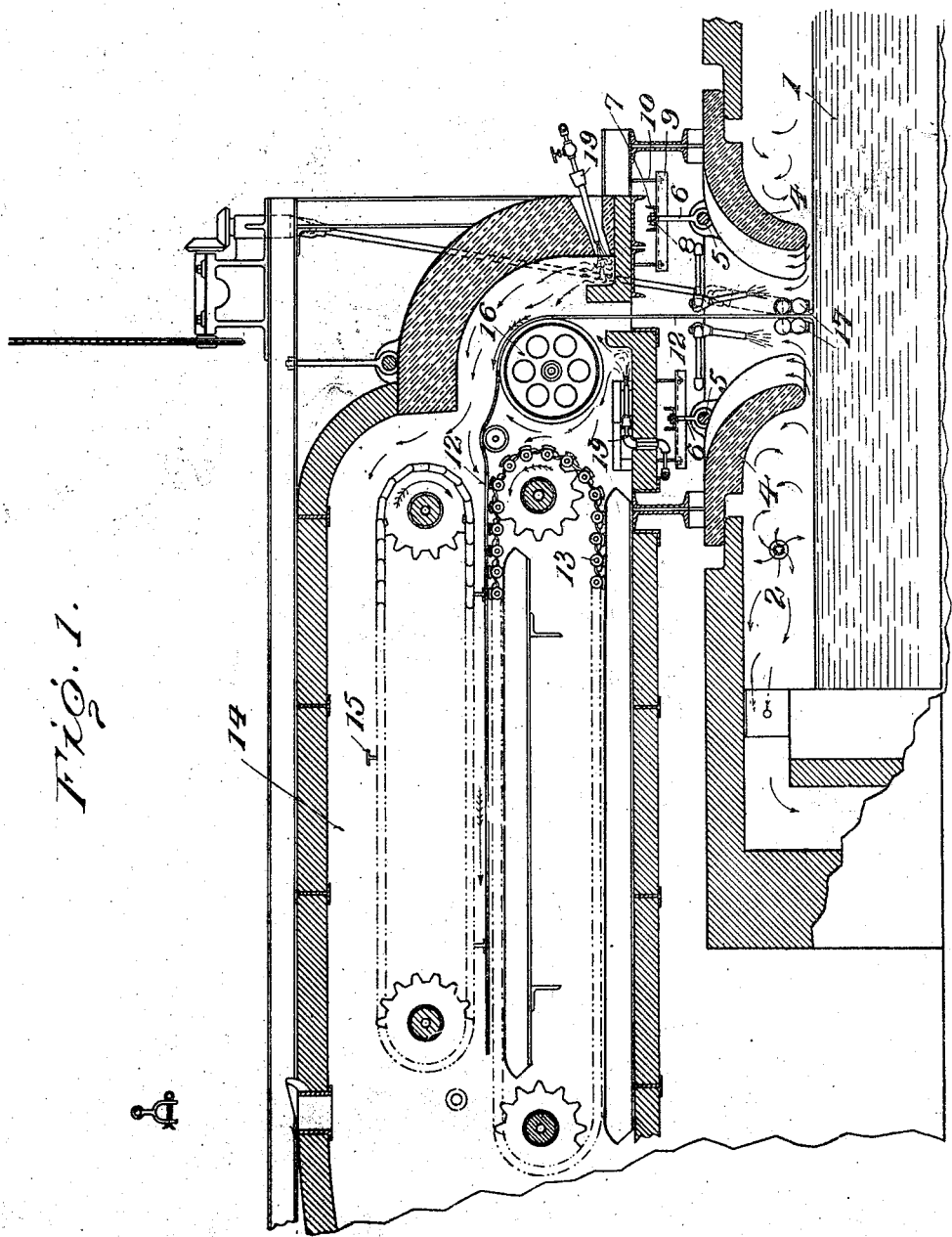

I. W. COLBURN.
METHOD AND APPARATUS FOR TEMPERING THE SHEET SOURCE
IN SHEET GLASS DRAWING MACHINES.
APPLICATION FILED SEPT. 28, 1908.

966,653.

Patented Aug. 9, 1910.

4 SHEETS—SHEET 1.

WITNESSES

INVENTOR
Irving W. Colburn
by Munro Cameron Lewis & Massie
Attorneys

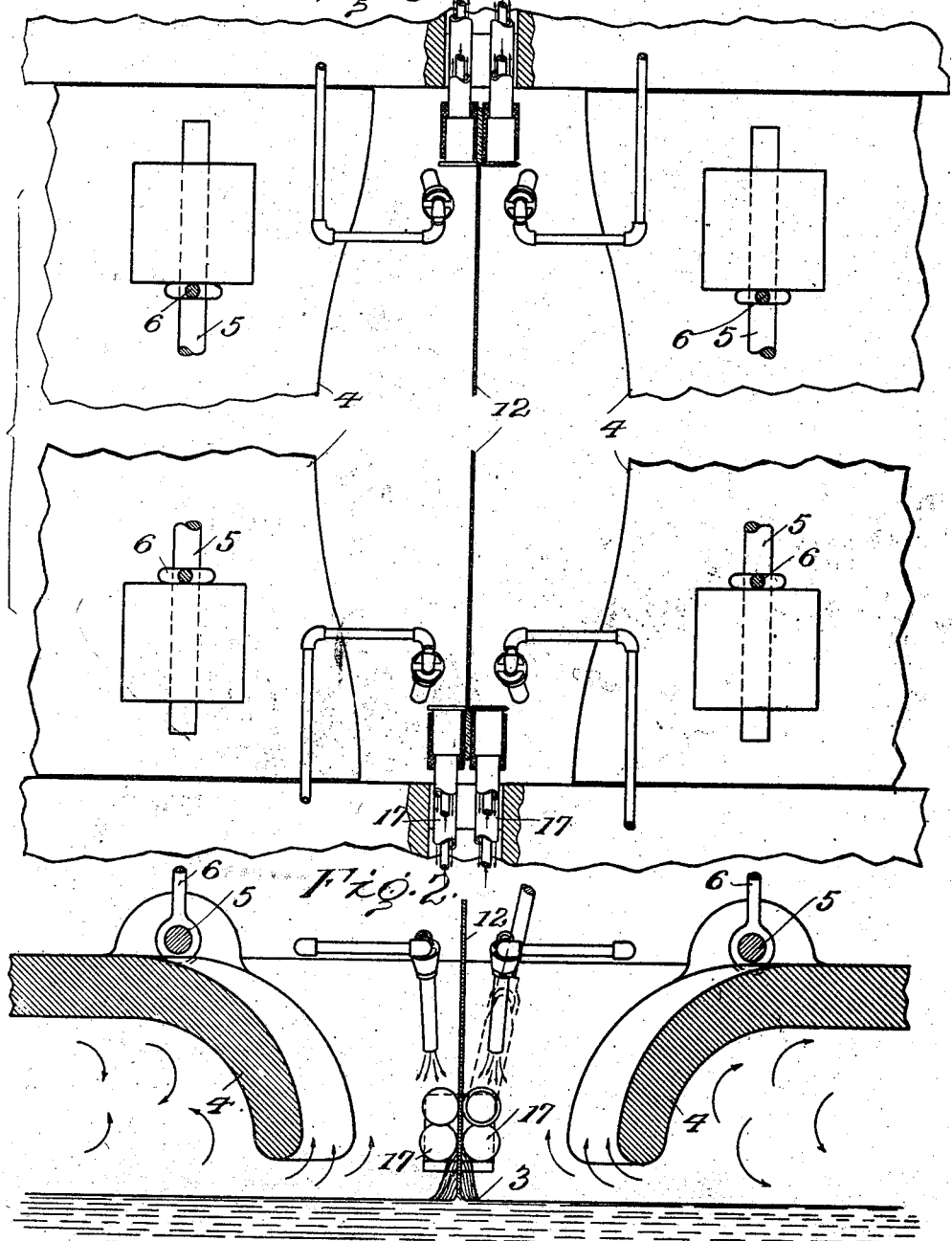

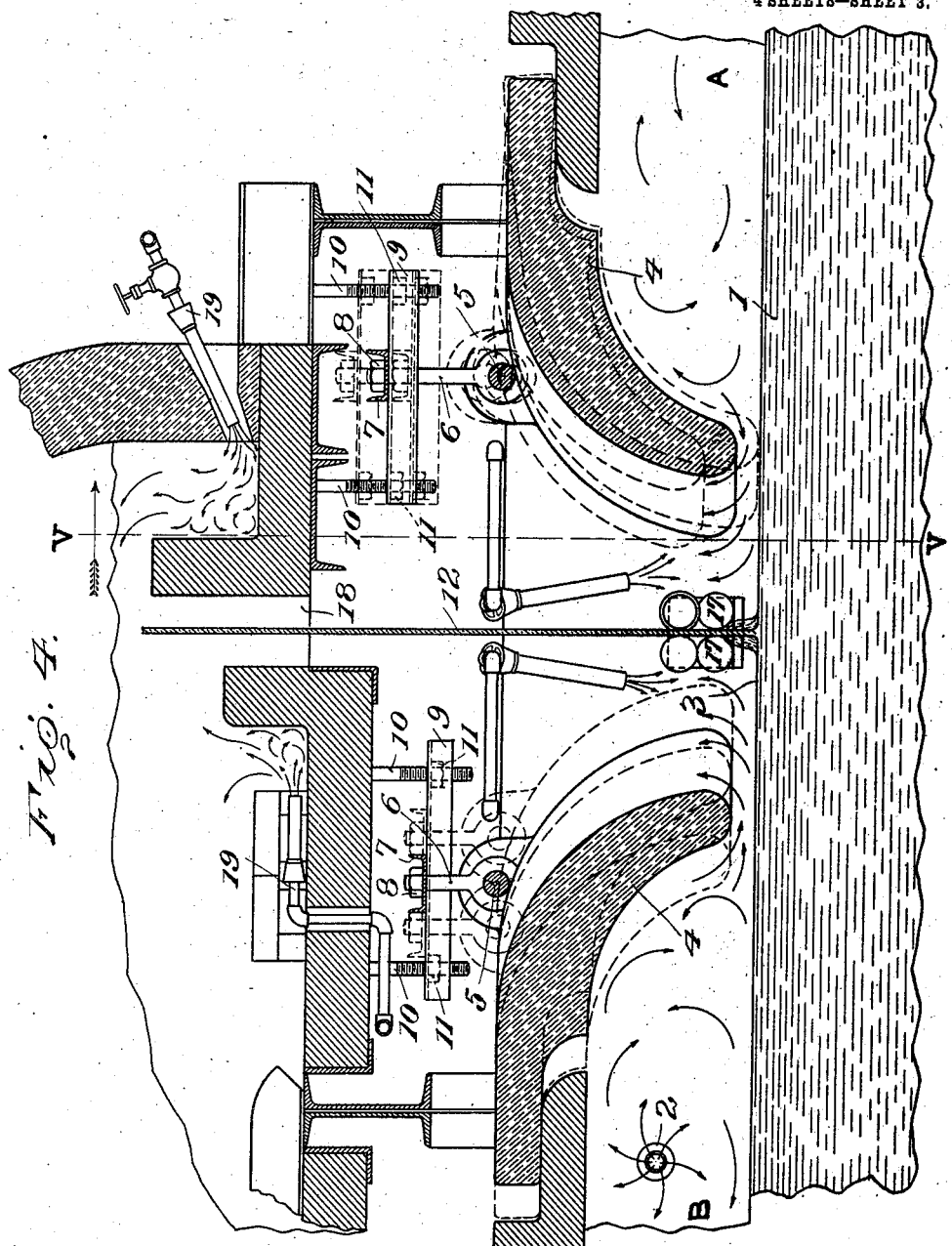

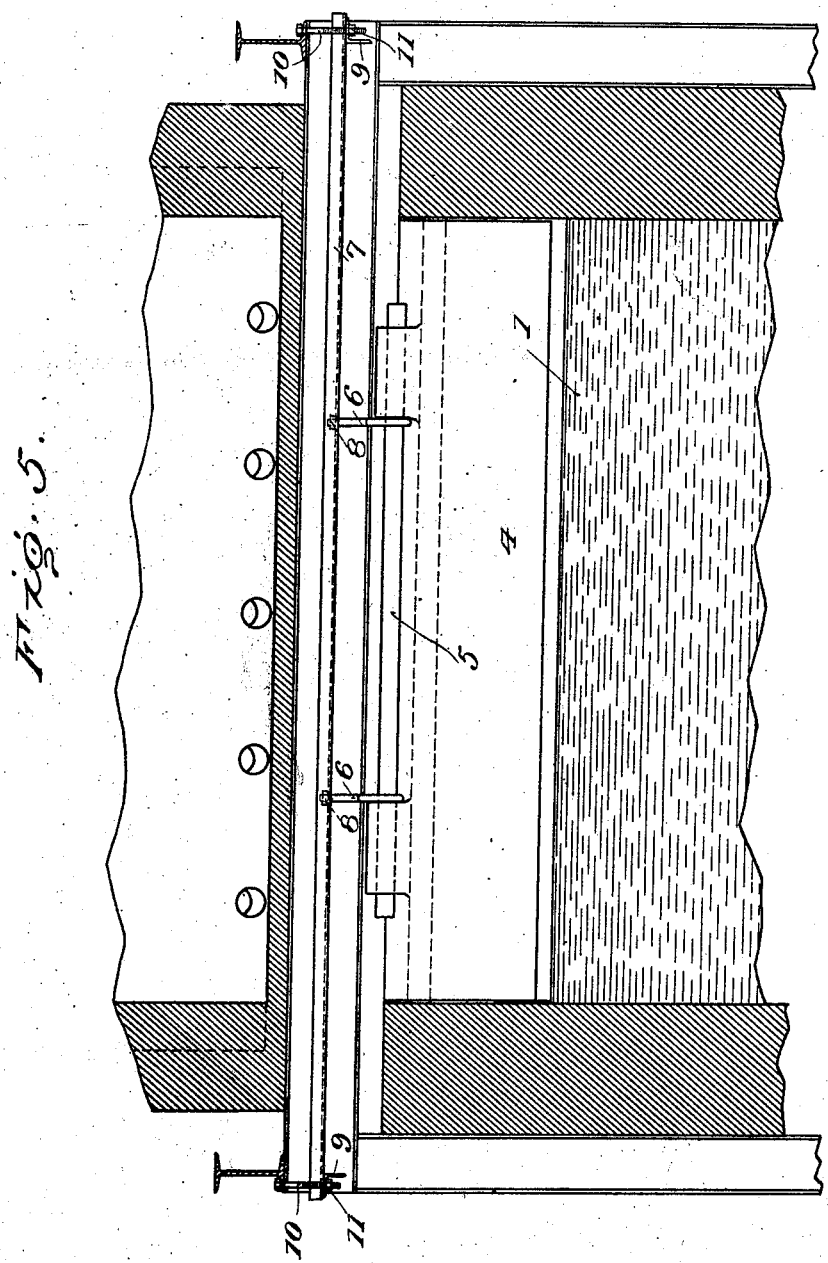

UNITED STATES PATENT OFFICE.

IRVING W. COLBURN, OF FRANKLIN, PENNSYLVANIA, ASSIGNOR TO COLBURN MACHINE GLASS COMPANY, OF FRANKLIN, PENNSYLVANIA, A CORPORATION OF NEW JERSEY.

METHOD AND APPARATUS FOR TEMPERING THE SHEET SOURCE IN SHEET-GLASS-DRAWING MACHINES.

966,653.

Specification of Letters Patent. Patented Aug. 9, 1910.

Application filed September 28, 1908. Serial No. 455,047.

*To all whom it may concern:*

Be it known that I, IRVING W. COLBURN, of Franklin, Pennsylvania, have invented a new and useful Method and Apparatus for Tempering the Sheet Source in Sheet-Glass-Drawing Machines, which invention is fully set forth in the following specification.

This invention relates to the art of drawing glass in sheet form from a mass of molten glass, and more particularly, it relates to a method and apparatus for tempering the molten mass at and adjacent to that portion of its area from which the sheet is drawn, and which area is hereinafter termed the "sheet source."

I have found from practical experience that it is a matter of some considerable difficulty to produce the requisite and desired temper in a mass of molten glass to secure the best results when drawing a sheet of glass therefrom solely by the application of heat-generating means and the regulation of such means. For reasons which it is not necessary here to enumerate, the molten mass of glass is liable to vary in temperature at different portions of the mass, and this variation in temperature at the different parts of the molten glass from which the sheet is drawn is liable, unless very great care is exercised, to produce a drawn sheet of glass which is not of uniform thickness.

By the present invention, instead of regulating the temperature of the molten mass from which the sheet is drawn by regulating the supply of heat applied to the molten glass, I superheat said mass as a whole, that is, heat it as a whole somewhat above the degree of temperature which it is desired the sheet source shall have in drawing the sheet, and I then produce the proper temperature in that portion of the molten mass of glass from which the sheet is drawn, *i. e.*, the "sheet source," by cooling the sheet source to a proper working degree, and the present invention consists of a method and apparatus for accomplishing this result.

Any suitable means for superheating the molten mass of glass may be employed, and any suitable apparatus whereby the temper of that portion of the molten mass constituting the sheet source can be brought to the desired degree to produce the best results, would be within the spirit of the present invention.

The inventive idea, both of the method and the apparatus, is capable of receiving a variety of specific expressions, and for the purpose of illustrating the invention, one form of apparatus for practicing the method of the invention is illustrated in the accompanying drawings, in which—

Figure 1 is a vertical, central, longitudinal section of a continuous glass drawing machine constructed for the practice of the invention; Fig. 2 is a similar section showing a detail on an enlarged scale; Fig. 3 is a broken plan view of a part of the working chamber and the covering therefor; Fig. 4 is a vertical central section on an enlarged scale of a part of Fig. 1; and Fig. 5 is a vertical transverse section on the line V—V of Fig. 4.

Referring to the drawings, in which like reference characters indicate like parts of the apparatus, 1 is a mass of molten glass, contained in any suitable receptacle therefor, and preferably in a continuous glass-drawing machine of the character herein illustrated, in direct connection with a suitable melting furnace. Means are provided for superheating the molten mass 1, and in the present instance this is accomplished by permitting the hot gases from the melting furnace on the side A, Fig. 4, to enter the working chamber containing the molten mass 1, and on the side, B, heat is supplied from any suitable source, as from a burner 2. From these sources of heat, the temperature of the molten mass 1 is raised to a degree materially above that which it is desired the molten mass shall have at that portion of its surface 3 from which the sheet of glass is to be drawn and which is herein referred to as the "sheet source." In order to reduce the temperature of the sheet source 3 to the desired degree, said mass of molten glass at the sheet source is caused to part with its surplus heat in any suitable manner. As here shown, this is accomplished by exposing the sheet source to the action of the external atmosphere, whereby the heat readily radiates from the sheet source, care being taken to control the amount and rate of radiation, in order that the desired temperature may be accurately secured. In the present instance, this result is accomplished by providing a cover of refractory material for the molten mass 1, and so constructing certain portions of said cover that the same may be adjusted both vertically and horizontally, to the end that the amount of the surface exposed to the atmosphere, and hence to radiation, may be regulated, and the amount of heated gases passing from the sources of heat on each side of the sheet may be also controlled. As here shown, two cover tiles 4, 4, are provided on either side of the sheet, which tiles are curved downward so as to come in close proximity to the surface of the molten mass 1, as will be readily understood by inspection of Fig. 1. These tiles are supported to swing on transverse rods 5, which rods are carried on eyebolts 6 whose upper ends are screw-threaded and pass through transverse metal beams 7 to which they are secured by nuts 8 on the screw-threaded ends of the rods. The beams 7 are supported at either end on longitudinally-extending metal supports 9 carried by depending rods 10 passing through the beams and having nuts 11 screw-threaded thereon. It will be seen that by this arrangement, the vertical adjustment of the tiles 4 may be secured by raising and lowering the metal supports 9, by the action of the nuts 11 on the screw-threaded rods 10, and that the horizontal adjustment of the tiles toward or from each other may be secured by moving the beams 7 along the supports 9, either toward or from the sheet of glass as desired.

In most cases it will be found that the mass of molten glass 1 in the working chamber is hotter at or near the central portion thereof than along the sides, and it is desirable, therefore, to make provision for radiating a greater amount of heat from the central portion than at the sides. With this object in view, the tiles 4 have their faces adjacent to the sheet of glass 12 formed on a curved line, with the end portions of the tiles 4 nearer the sheet than the middle portion of the tiles (see Fig. 3), so that a greater portion of the surface of the molten mass of glass is exposed to the cooling influences of the atmosphere at the center than at the sides.

In an apparatus thus constructed, the mass of molten glass 1 is superheated by the hot gases passing from the melting furnace and from suitable burners, and the sheet source is tempered by exposing a greater or less area to the cooling action of the atmosphere, and by raising or lowering the tiles 4 a greater or less amount of the heated gases to the rear of the tiles may be permitted to escape and pass over the sheet source and upward to assist in the regulation of the temperature of the sheet source.

Any suitable sheet-glass drawing means may be employed such, for example, as that shown in previous patents of mine, in which an endless carrier table 13 is located in a chamber 14, and a series of grip bars 15 on an endless carrier chain coöperates with the table to grip the sheet of glass 12 and advance it through the chamber 14, the sheet passing over a suitable bending roll 16 to change it from a vertical to a horizontal line of movement. Moreover, any suitable means may be employed for overcoming the wellknown tendency of the sheet to narrow during the drawing operation, as for example, suitable rollers 17, 17, located immediately above the sheet source and engaging the edge portions of the sheet during the drawing operation.

In apparatus thus constructed, the sheet is "drawn" in the space between the tiles 4, 4, in close proximity to and immediately above the surface of the sheet source, after which the drawn sheet passes upward into the open atmosphere, where it cools and hardens, and is then passed into the chamber 14 at the opening 18, and is reheated by the application of heat from any suitable source, as burners 19, sufficiently to permit it to be bent over the bending roll 16 without breaking.

While the particular continuous sheetglass drawing apparatus herein shown is an efficient one for the purpose, it is not to be understood that the present invention is limited to the particular apparatus herein shown for drawing the sheet, nor that it is limited to a continuous sheet glass drawing apparatus, since any apparatus that will act to draw a sheet of glass from a properly tempered sheet source would be within the spirit of the present invention. Furthermore, while I have herein shown means for exposing a greater or less area of the sheet source to the atmosphere for the purpose of tempering the same by radiation into the open atmosphere, it is not to be understood that the invention is limited to this or any other specific means for effecting the tempering of the superheated mass of molten glass at the sheet source, since any means that will act to thus temper that portion of the superheated molten mass constituting the sheet source, would be within the spirit and scope of the present invention.

Having thus described my invention, what is claimed is:

1. The method of tempering the sheet source in drawing sheet glass, which consists in superheating the main body of molten glass from which the sheet is to be drawn and then causing the escape of heat from the sheet source (or area from which the sheet is formed) till said sheet source is brought to the proper drawing temper, substantially uniform throughout its length.

2. The method of tempering the sheet source in drawing sheet glass, which consists in superheating the main body of the molten glass from which the sheet is to be drawn, while protecting said mass from the cooling effects of the external atmosphere, and then reducing the molten glass along the line where the sheet is to be drawn to a substantially uniform temperature below the temperature of the main body of superheated molten glass.